United States Patent [19]

Sansone et al.

[11] Patent Number: 4,907,161
[45] Date of Patent: Mar. 6, 1990

[54] BATCH MAILING SYSTEM

[75] Inventors: Ronald P. Sansone, Weston; Barry H. Axelrod, Newtown; Kevin D. Hunter, Stratford; William G. Hart, Stamford; Wojciech M. Chrosny, Milford, all of Conn.

[73] Assignee: Pitney Bowes Inc., Stamford, Conn.

[21] Appl. No.: 940,102

[22] Filed: Dec. 10, 1986

Related U.S. Application Data

[63] Continuation-in-part of Ser. No. 813,445, Dec. 26, 1985, which is a continuation of Ser. No. 762,994, Aug. 6, 1985, Pat. No. 4,725,718.

[51] Int. Cl.$^4$ .............................................. G07B 17/00
[52] U.S. Cl. ............................... 364/464.02; 235/375; 364/900; 364/918.52; 364/919.4
[58] Field of Search ...................... 235/375, 382, 382.5; 364/464, 900, 464.02; 380/23; 902/2

[56] References Cited

U.S. PATENT DOCUMENTS

| 3,792,446 | 2/1974 | McFiggins et al. | 364/900 |
| 4,097,923 | 6/1978 | Eckert, Jr. et al. | 364/900 |
| 4,122,532 | 10/1978 | Dlugos et al. | 364/900 |
| 4,376,299 | 3/1983 | Rivest | 364/900 |
| 4,447,890 | 5/1984 | Duwel et al. | 364/900 |
| 4,629,871 | 12/1986 | Scribner et al. | 235/375 |
| 4,725,718 | 2/1988 | Sansone et al. | 235/375 X |
| 4,760,532 | 7/1988 | Sansone et al. | 235/375 X |
| 4,760,534 | 7/1988 | Fougere et al. | 235/375 |

Primary Examiner—Parshotam S. Lall
Assistant Examiner—Edward R. Cosimano
Attorney, Agent, or Firm—Donald P. Walker; Melvin J. Scolnick; David E. Pitchenik

[57] ABSTRACT

The present invention is directed to a system wherein a mailer is able to send large quantities or batches of mail. The mailer has a secure accounting unit similar to a postage meter in which postage value is placed by a central station which is also in communication with a remote resetting center for accounting for funds transferred to the accounting unit. The central station communicates with the mailing station in order to obtain data relative to the mail processing whenever the funds are to be transferred to the accounting unit. The central station may also serve to lock or unlock the mail processing at the mailing station. Receipts may also be provided for the funding transactions.

13 Claims, 13 Drawing Sheets

```
┌─────────────────────────────────────────────┐
│ ▓▓ PB  SERVER  NO. 7124   CUSTOMER NAME     │
│                                             │
│   T.A. NO.      PIECE COUNT      REG. AM.   │
│   DATE          TIME             CLASS      │
│   BATCH NO.     RUN NO.          POST. TOTAL│
└─────────────────────────────────────────────┘
```
46

FIG. 2

```
┌──────────────────────────────────────────────┐
│                              ┌─────────────┐ │
│  ADDRESSOR                   │ US POSTAGE  │ │
│                              │ FIRST CLASS │ │
│                        43 ─  │  - PAID -   │ │
│                              │PB SERVER#7124│ │
│                              └─────────────┘ │
│                                              │
│   66 ─ 22¢101886*274356        18993662      │
│   64 ─ JOHN J. DOE                      68   │
│   62 ─ TAIL SPIN ROAD                        │
│   60 ─ WAXTON CT. 06999-1243                 │
│                                              │
└──────────────────────────────────────────────┘
```
42

```
PITNEY BOWES MANIFEST MAIL SYSTEM
    FUNDS TRANSACTION RECEIPT

DATE OF TRANSACTION:  JULY 03, 1986      TIME OF TRANSACTION:  15:26 EDT

TRANSACTION NUMBER:  3A125D              COMMUNICATION NUMBER:  XYZZR-N

AMOUNT OF TRANSFER:  $1,000.00           NEW BALANCE:  $7,268.275
```

160

SERVER INITIATED COMMUNICATION

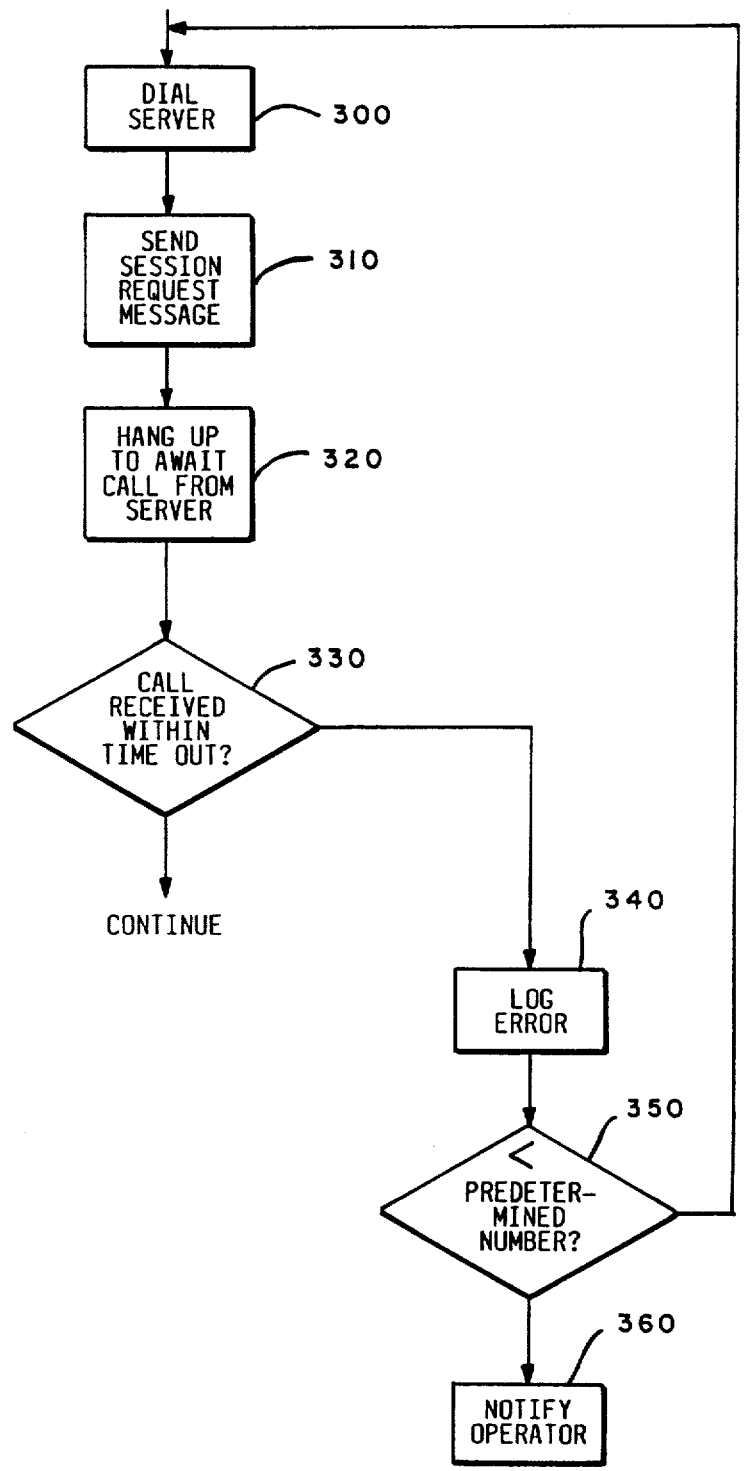
FIG.10 — CENTRAL STATION INITIATED COMMUNICATION

BATCH MAILING SYSTEM

This application is a continuation-in-part of copending application Ser. No. 813,445 filed Dec. 26, 1985, entitled "BATCH MAILING SYSTEM" by Sansone, et. al., which is a continuation of application Ser. No. 762,994, now U.S. Pat. No. 4,725,718.

RELATED CASES

Subject matter similar to the subject matter contained in the instant application may be found in U.S. Pat. No. 4,725,718 entitled "POSTAGE AND MAILING INFORMATION APPLYING SYSTEM" by Ronald Sansone, et. al., and assigned to the assignee of the instant application.

BACKGROUND OF THE INVENTION

Certain organizations periodically dispatch large amounts of mail. Examples of such organizations are: banking institutions, utility companies, insurance companies, credit companies, and the like. In order to handle such large quantities of mail, these mail senders normally pre-package and presort their mail and are given a lower postage rate by the postal service because of the time saved by the postal service.

There are generally two ways in which such mail senders apply postage to their mail. The more common way is by use of a postage meter which is leased by the mail sender from a postage meter manufacturer with which the amount of postage required is applied to each mail piece. Inserter systems have been developed whereby inserts may be placed into an envelope and the envelope may be sealed, addressed and have a postage indicia applied thereto. The mail pieces may be weighed on the fly or individual weighing may not be required if all the mail pieces are of like kind, i.e., only a sample mail piece need be weighed. These acts of processing mail may be performed at a relatively high rate of speed.

A second method of mailing large quantites of mail pieces is to employ a permit mail system. In such a system the mail sender places a permit number on the mail pieces and prepares a manifest listing that shows the type and number of mail pieces being mailed on each occasion and the postage required.

With both such systems, inspection at the site of the mail sender is required. In the case of the postage meter, the lessor of the postage meter, i.e., the postage meter manufacturer, is required by law to inspect the postage meter at least twice a year to ensure that there is no evidence of tampering with the postage meter that would indicate an attempt to obtain unauthorized postage. In the case of permit mail, large quantites of the same type of mail are mailed at the same time and the postage service conducts an inspection to verify that the manifest listing accompanying the permit mail accurately accounts for the amount of postage due for the mail that has been processed by the postal service. This is accomplished by an inspection on the part of the postal service, by examining the records of the mail sender on every occasion.

Obviously, each of these two systems has certain drawbacks. In the case of on-site inpsection of postage meters, due to the large number of postage meters in use by large mail senders, inspection thereof is an expensive matter. Furthermore, postage meters that process large quantities of mail must be replaced relatively frequently because of wear. With regard to the permit mail system, a shortcoming lies in the need of the postal service to send a representative frequently to the various mail sender locations to ensure that the mail sender is accurately accounting for the quantity of mail being sent. Such a scheme is not totally reliable since it relies upon on-site verification using the mail senders records which are not secure.

SUMMARY AND OBJECTS OF THE INVENTION

Briefly stated, the present invention is directed to the provision of a system wherein a mail sender is able to send large quantities or batches of mail. This is accomplished by the mail sender having a secure accounting unit similar to a postage meter wherein postage value is placed by a dispensing, or central, station. A statement, also called a passport, accompanies each batch of mail, and contains information relative to the mail and the amount of postage required. Communication between the central station and the mail sender allows postage value to be transferred to the mail sender by the central station and mailing and verification data to be sent to the central station from the mail sender. The mailing and verification data can be the same as that contained on the mailing statements that accompany the batches of mail. This system provides a central station for a large number of mail senders whereby the postal service is relieved of its obligation of having on-site inspections. In addition, the central station acts as a clearing house for the postal service through whom verification of postage can be conveniently and inexpensively achieved. Advantageously the central station may be a data collection apparatus separated from and communicating with a known remote resetting center whereby extensive modifications of the existing remote resetting facilities are not required.

A further feature of this invention is that the security features of a postage meter are provided while allowing a high speed, relatively inexpensive printer to be used for printing the mail pieces.

A still further feature of the invention in the provision of documentation for facilitating the inspection of presorted or other batch processed mail while enhancing the security of funds for such mailing, as well as the provision of mail pieces so marked in accordance with the invention that correspondence between the documentation and mail pieces is readily established, to ensure the accurate and proper accounting of funds.

The documentation provided to the mail sender may include a receipt showing the transfer of funds between the remote resetting center and the mail sender.

BRIEF DESCRIPTION OF THE DRAWINGS

In order that the invention may be more clearly understood, it will now be disclosed in greater detail with reference to the accompanying drawings, wherein:

FIG. 2 is a plan view of an accounting statement that accompanies batch mail sent by the system of FIG. 1;

FIG. 3 is a plan view of an envelope containing information that is applied thereto by the system of FIG. 1;

FIG. 8 is an illustration of documentation for a funds transfer; and

FIGS. 9, 10, 11a, 11b, and 12-14 are flow diagrams describing the functions of the system shown in FIG. 7.

DETAILED DESCRIPTION OF THE PREFERRED EMBODIMENT

Figure 1:
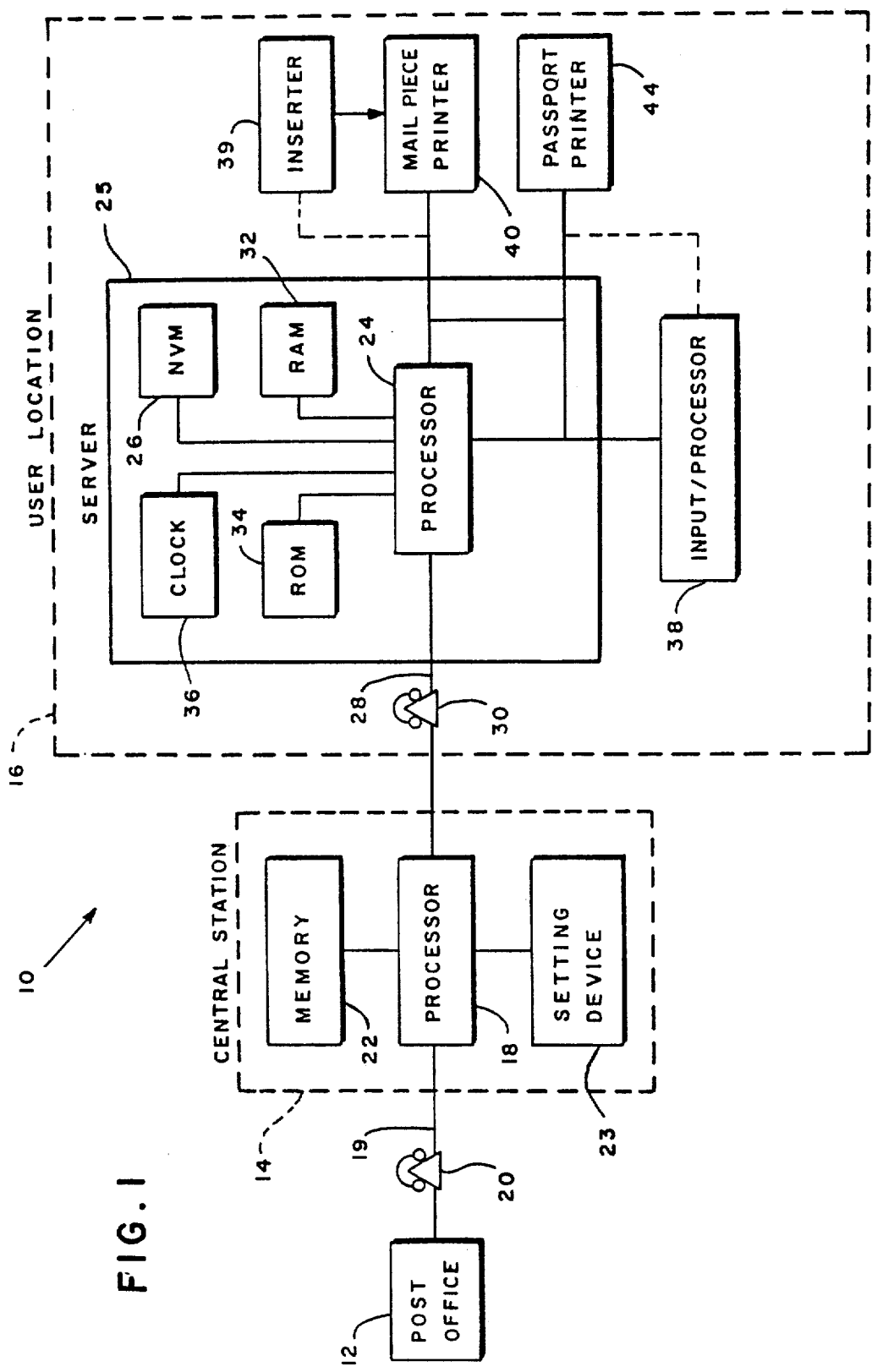
FIG. 1 is a block diagram of a batch mailing system.

Referring now to FIG. 1, a batch mailing system is shown generally at 10 and includes a post office 12, a central station 14 and a user location 16. The central station 14 has a processor 18. This processor 18 is a main frame type of computer or the like having substantial capacity. Communication is provided between the post office 12 and a plurality of central stations 14 (only one being shown) through a line or communication link 19 having a communication device such as a telephone 20 therein. Associated with the processor 18 and in connection therewith is a large storage memory unit 22 where large amounts of data can be stored and a register setting device 23 for resetting of postage meters remotely. Systems for the resetting of meters remotely are well known, see for example, U.S. Pat. Nos. 3,792,446, 4,097,923 and 4,447,890.

A remote user location (mailing location) 16 has a secure unit 25 that will hereinafter be referred to as a "server". The server 25 is preferably supplied by the operator of central station 14 to the user and includes a user postal information processor 24 that may be a CPU of much smaller capacity such as an Intel 8085 processor available from Intel Corporation, Santa Clara, Calif. or an equivalent. Connected to the CPU 24 is a memory 26. Preferably the memory 26 is a non-volatile memory (NVM). The postal information processor 24 is connected to the central station processor 18 by way of a communication link or line 28. A telephone 30 or other communication device may be disposed within the line 28 to thereby provide selective communication between the processors 18, 24. Also connected to the processor 24 are a RAM 32, a ROM 34 and a clock 36 whose respective functions will be described in detail hereinafter. An input/processor 38 is connected to the user processor 24 whereby data may be supplied, either manually or through a medium such as a disc or tape, to the user processor 24 for the purpose of providing data required in the processing of mail pieces. The input/processor 38 may be any of a large number of personal computers having keyboard and display that are commercially available, such as an IBM XT personal computer.

A high speed inserter 39 is in electrical communication with the server 25 and performs the physical acts involved in processing the mail such as the inserting of inserts into envelopes, sealing the envelope flaps, orienting the mail pieces and conveying the mail pieces to a postage meter or printer. The term "insert" includes bills, advertising materials, notices, etc., that are of a size to be received within an envelope or the like. High speed inserters of this type are readily available commercially, as for example Inserter Model No. 3100 Series from Pitney Bowes Inc., Stamford, Conn.

A first printer 40 is in communication with the user processor 24 of the server 25 and with the input/processor 38 and is able to print upon mail pieces 42 such as envelopes containing inserts that it receives from the inserter 39. This printer 40 is one provided by the user and is preferably an unsecured, high speed printer that may be controlled either through the processor 24 or through the input/processor 38. A second printer 44 is provided to print upon a statement sheet 46 or other document. This second printer 44 is preferably a secure printer that is preferably provided by the operator of central station 14. "Secure", as used herein, means that the device is constructed in the same manner as a postage meter; that is, access to the interior thereof is limited by its construction to only authorized personnel. An example of such a postage meter is a Model 6500 postage meter available from Pitney Bowes Inc., supra. The second printer 44 may be an unsecured printer having a secure accounting module associated therewith. Throughout the balance of the specification and claims this statement sheet 46 will be referred to as "passport". Details of the passport 46 will be described hereinafter in conjunction with FIG. 2.

Although only one user location 16 is shown and described, it will be appreciated many user locations may be serviced by the same central station 14. The central station 14 may be at the location of a postage meter manufacturer or other accountable organization.

In operation, the user at the user location 16 will generally be a sender of large quantites of mail who has been given an identification number by the central station 14 that will be placed in the NVM 26 of the server 25. This identification number is permanent and unique for each server 25 and the user has no access to that portion of the NVM 26 that stores the identification number. It will be appreciated that this feature may be applied to postage meters as well. Having the identification number in memory 26 eliminates the need of having a plate applied to a postage meter or a server 25. It will be appreciated that a server 25 has many characteristics of a postage meter, i.e., security, a descending register, and the like, but certain elements are absent. The most evident absent element is a printer, the advantage of which is described in the following paragraphs. Following installation of the identification number, the user communicates with the central station 14 through the telephone 30 for the purpose of indicating to the central station 14 the amount of postage value it wishes to have accredited to its memory 26. An access code is then given to the user that can be addressed to the setting device 23 through the touch dial of the telephone 30. Upon receipt of the access code, the user transmits to the central station 14 the access code and his identification number and the request for an amount of postage value. The setting device 23 functions to charge, or increase, the postage value into the memory 26. This memory 26 includes a descending register that is charged by the central station 14 with the selected amount of postage value. As the user location 16 processes mail, the postage value in the descending register will be decreased in accordance with the postage required to process the mail pieces 34. Devices for charging registers such as the descending registers are well known, as disclosed for example in U.S. Pat. Nos. 3,792,446, 4,097,923 and 4,447,890.

The balance of the server 25 includes the ROM 34 that contains information that formats address signals and stores a series of programs for controlling the functions of the server 25, a RAM 32 that holds and supplies real time data, and a clock 36 that provides the time and date. It will be appreciated that many of the functions may be incorporated on an Intel iSBC B/6/35 single board computer for instance.

It will be appreciated that the printer 40 is a high speed, inexpensive, unsecured printer such as an ink jet printer or laser printer or any type of dot matrix printer which that will apply the addresses of the addressee and addressor to the face of the mail pieces under command of the input/processor 38. In addition, other information can be printed by the printer 40 upon each mail piece 42 when under command of the processor 24. This information includes a transaction number (T.A. No.), the run of the particular batch of mail, the date and time of mailing, the class of mail and a batch number. The transaction number is that number assigned to the user location 16 by the central station 14 every time postage value is added to the server 25 and stored in the NVM 26. This transaction number is the same for one or more batches of mail that are sent and remains the same until such time as the descending register of the NVM 26 is recharged with postage value, at which time a new transaction number is assigned and stored in the NVM in place of the preceding transaction number. By changing the transaction number upon each recharge, an element is provided for verifying postage. The batch number is one assigned by the user through the input/processor 38 whereby a given batch of mail, i.e., mail of a particular type or character, is identified by a number assigned by the user. In addition, a run number, usually a subset of the batch, may be given to identify particular segments of the batch.

When a batch of mail is to be sent, the user supplies mailing and verification information through the input/processor 38 into the user processor 24 that transmits at least a portion of this information to the inserter 39. This information includes a number of mail pieces to be processed and number of inserts to be placed in each envelope. The time and date may be supplied to the printer 40 through the input/processor 38 by overriding the clock 36. This overriding is useful when future mail is being processed. The user processor 24 then commands the printer 40 to print the appropriate postage, time, date, transaction number and address on the mail pieces 42 for a particular run. This run is given a number that is associated with the particular mail to be sent, which number is printed on the envelopes 42 of that run. As the printer 40 prints the appropriate information upon each mail piece, the number of mail pieces and amount of postage required is determined by the processor 24. At the end of the run or batch, the second printer 44 prints authorization information upon a passport 46.

Referring now to FIG. 2, one embodiment of the passport 46 is shown after having printed thereon the total postage (Post. Total) required to mail the batch of mail, the transaction number (T.A. No.), piece count for a batch, descending register amount (Reg. Am.) after subtraction for the postage, the date, the time, the class, the batch number and the run number (optionally). Additionally, the server number, i.e., the identification number stored in the NVM 26, user name and any desired graphics can be printed. This information on the passport 46 serves many purposes. Firstly, the register amount acts as a physical record of the postage value stored in the descending register of the NVM 26. This amount is printed on the passport 46 on the upper right hand. The register amount is that amount in the descending register after all postal charges have been made for the batch of mail to be sent. Since this register amount is placed on the passport 46 after the printing of each batch of mail, an ongoing, permanent record is maintained of the amount of postage value contained within the NVM 26. In this way, if there is a disaster wherein the server 25 is destroyed or the memory 26 therein is inadvertently erased, the user still has a means for verifying the amount of postage value remaining from that amount of postage value originally purchased and stored. The transaction number provides an authorization check as does the identification or server number. By changing the transaction number with each recharge of the server 25, one can readily determine if more postage accompanies a transaction number than is authorized. Also printed on the passport 46 will be the date and time the passport 46 is printed, the piece count, i.e., the number of mail pieces mailed in the particular batch, and the class of mail. Upon the printing of the information on the passport 46, the postage amount for the batch is subtracted from postage value stored in the descending register of the NVM 26.

The information printed upon the passport 46 is transmitted to the central station 14 through the communication line 28 automatically after each batch, is processed so that a record is maintained through the processor 18 that communicates with memory 22. The memory 22 has an ascending register therein that corresponds to the descending register in the server 25, i.e., one is the inverse of the other. As is known, an ascending register is one that accumulates charges over a long term. Optionally, the memory 22 may have a descending register that duplicates the amounts in the descending register in the NVM 26 on an ongoing basis. By having the postage value contained within the memory 22 that corresponds to the value of the server 25, a check is constantly made to ensure that there is a correspondence between the passport 46 information and the amount of postage paid by the user. More specifically, the total amount credited to the user location 16 is stored in memory 22 and if the amount in the ascending register exceeds that total amount available to the user, the user location 16 is notified that there are insufficient funds. When a batch of mail is sent to a post office for processing, the passport 46 for that particular batch accompanies the mail. The postal employee can determine whether it is an authorized transmission of mail from the information contained upon the accompanying passport 46. If there is any question on the part of the postal service as to whether the information is authentic, it contacts the central station 14 and through the line 19 obtains information from the central station 14 to verify the information contained on the passport 46. If this information is accurate, i.e., the postage for the mail has been paid. On the other hand, if there is any discrepancy, the postal service is able to act to ferret out any fraud or correct any discrepancy. As in the usual practice in the user of postage meters, each user location 16 sends all its mail to an assigned post office.

Referring now to FIG. 3 an envelope 42 is shown as it would be prepared in accordance with one embodiment of the present system 10. The upper left hand corner contains the address of the mail sender and the upper right hand corner contains a pre-print block 43 containing the class of mail and gives the identification number of server number of the mail sender. This informatin may be preprinted on the envelopes 42 prior to processing of a batch. Such preprinting may be accomplished through direct communication of the input/processor 38 with the printer 44 without any participation of the other components of the user location 16.

In the processing of batch mail, the three address lines are first printed in the address field with the name of the recipient 64, the street address 62 and the city, state, zip code 60. The fourth line, or postage line is then printed using information supplied by the processor. This postage line 66, includes the postage amount $0.22, the date, Oct. 18, 1986 and the transaction number, that in this case is *274356. Other information may be given on this postage line if so desired as represented by the numerals 18993662" designated 68 in FIG. 2, including the time the mail is processed. Although the postage line is shown in alphanumerics it will be appreciated that the same may be printed in bar code and, optionally, bar code address information may be printed on the envelope as desired. Additionally, the information in the pre-print block 43 may be printed in the address field with the other information therein and the pre-print block may be eliminated.

Although an envelope 42 shown has the postage and address information printed on the face thereof the same scheme applies to window envelope. In a windowed envelope it may be preprinted as previously described but instead of the printer 40 printing on the face of the envelope 42, an insert is printed with the same information shown on the face of the envelope 42 and inserted so as to be viewed from the window. Alternatively, the postage and address information may be printed upon a label and the label may be attached to the envelope 42.

In this way a method is provided for allowing an organization to send large amounts of mail without having to frank every piece. In addition, the postal service is saved the problem of requiring on-site inspections at the user location 16 in order to verify that no unauthorized mail is being sent. By correlating the amount of postage, the transaction number, piece count, registration amount and the like, verification can be made without the need of encryption. The central station 14 acts more or less as a bank representing the postal service and handles the funds on its behalf as well as maintains records for verification. The funds or postage value charged to the server st may be either prepaid or charged to the user by the central station 14 on a credit arrangement. The central station 14 may be accountable to the postal service for the postage value placed in the server 25 on an immediate basis. The central station 14 may be a postage meter or server 25 manufacturer or any other reliable entity.

Another advantage of this system is that the printer 40 that prints the large numbers of mail pieces is not part of a secure member, i.e., the server 25, as in the case of a postage meter. Because of this, the printer 40 may be replaced frequently without the expense of inconvenience of entire replacement. It will be appreciated that one printer may be used in place of the two printers 40, 44 shown and described, but the preferred embodiment contemplates the use of two printers for the reasons given.

Figure 4:
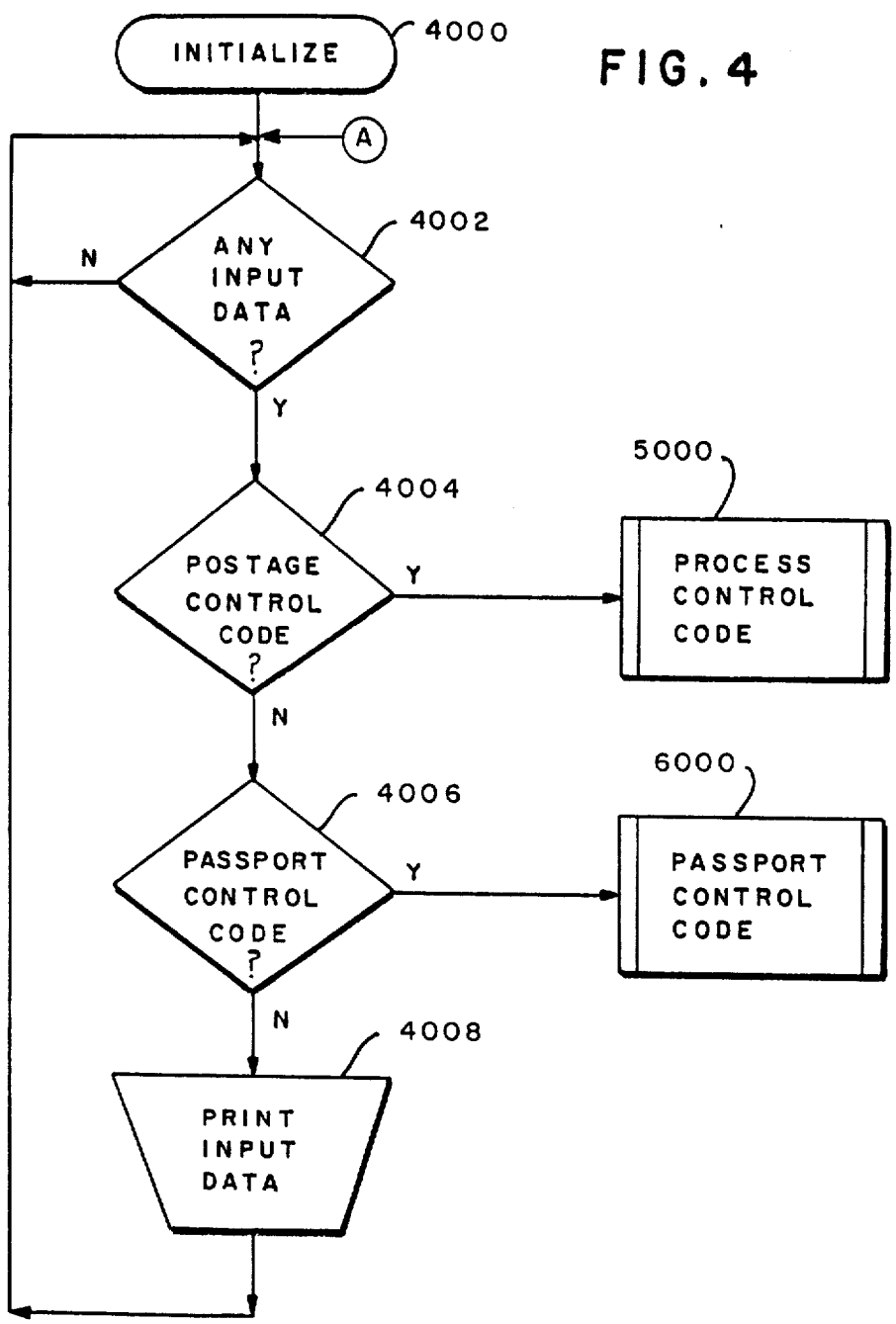
FIGS. 4-6 are flow diagrams that describe the functions of the system shown in FIG. 1.
Figure 5:
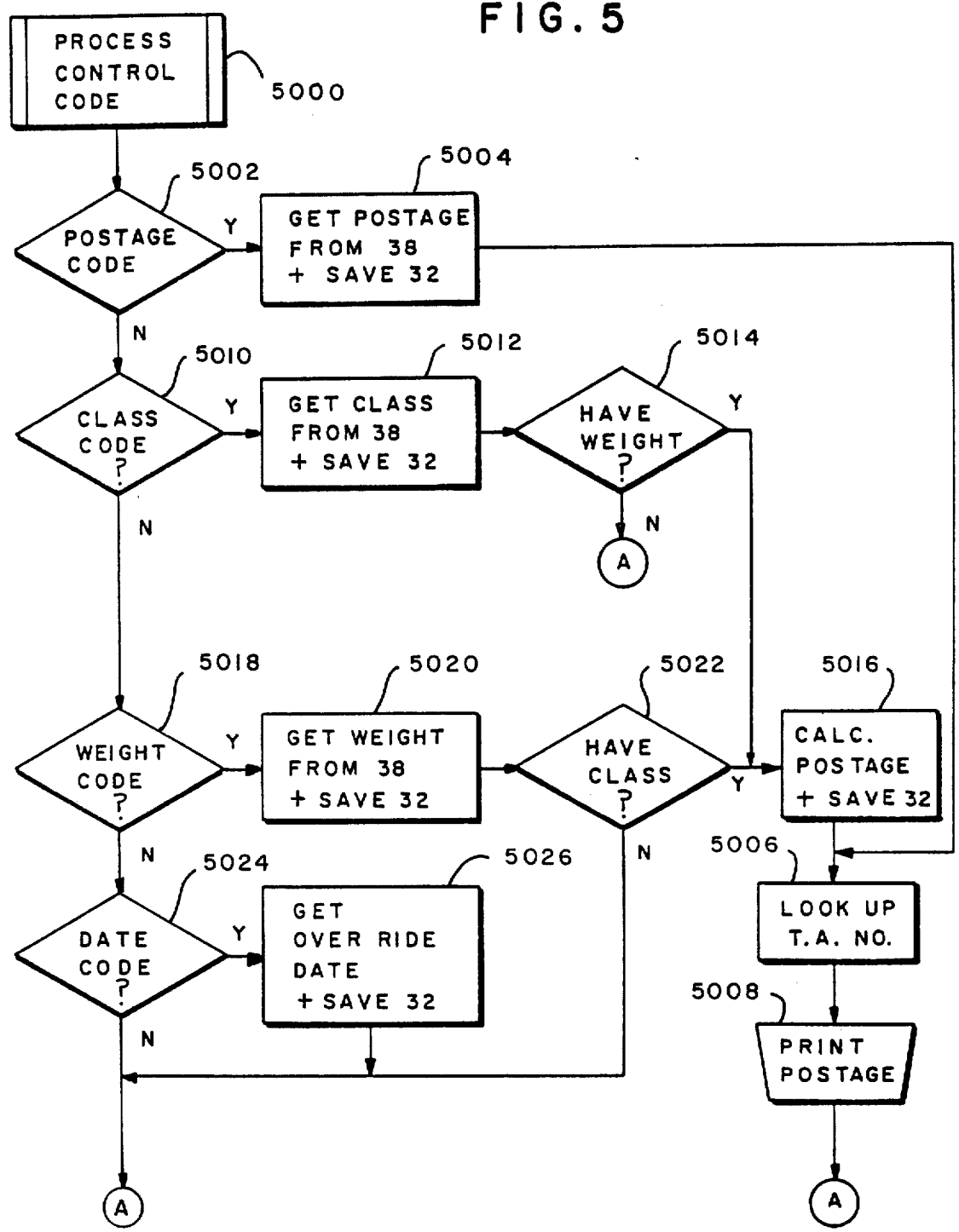
Figure 6:
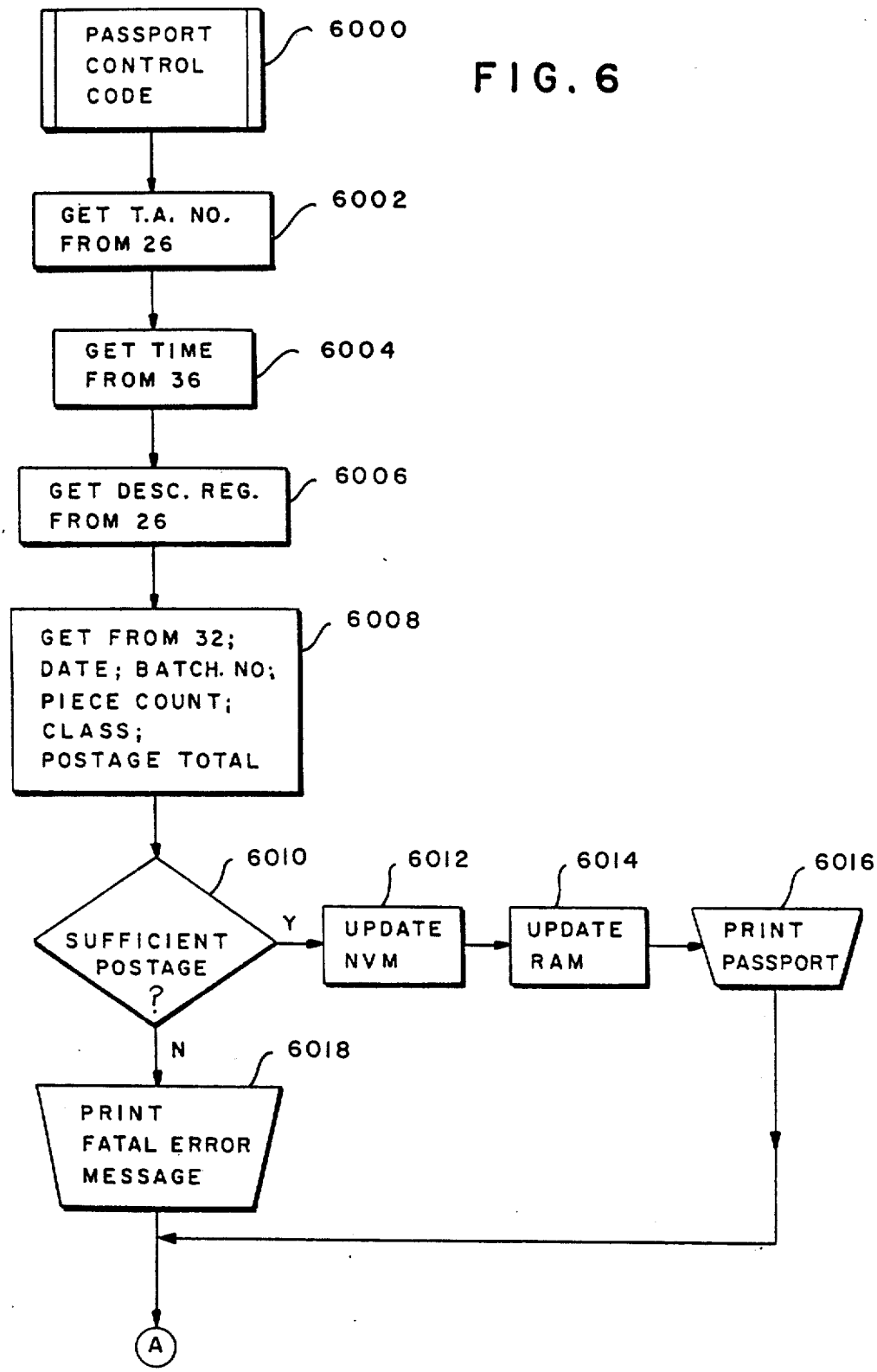

FIGS. 4–6 are flow diagrams showing preferred operation methods for the arrangement of the invention, as illustrated in FIG. 1. Thus, FIG. 4 illustrates briefly a background program for processor 24, FIG. 5 illustrates a program for the processor 24 for the determination of the postage to be accounted for and the printing of the mail pieces, and FIG. 6 illustrates a program for the processor 24 for the development of data for, and the printing of, the passport 46.

In operation, the background program of FIG. 4 is conventionally initialized, step 4000, followed by the program implementing the step, 4002, of inquiring if any input data has been received, Assuming no input data is received, step 4002 is repeated until data is received. Whereupon the program implements the step, 4004, of determining whether or not the input data is a postage control code. If the input data is a postage control code, step 4004, the program implements the subroutine 5000, shown in FIG. 5, of processing the postage control code. However, if the input data is not a postage control code, step 4004, the program implements the step, 4006, of determining whether or not the input data is a passport control code. If the input data is a passport control code, step 4006, the program implements the subroutine, hereinafter discussed, of processing the passport control code 6000 (FIG. 6). However, if the input data is not a passport control code, step 4006, the program implements the step, 4008, of causing the input data to be printed. Whereupon processing is returned to the initial step, 4002, of inquiring if any data is received.

As shown in FIG. 5, when the control code processing subroutine 5000 is invoked, the routine initially implements the step, 5002, of determining whether or not the postage control code is a postage code. Assuming that it is a postage code, step 5002, the program implements the step, 5004, of obtaining the postage from the input/processor 38 and storing it in the RAM 32, followed by the step, 5006, of fetching the transaction numbers (T.A. No.) for the run of the particular batch of mail. Whereupon the routine implements the step, 5008, of causing the postage to be printed, followed by the return of processing to the background program, "A", of FIG. 4. Assuming, however, that the postage control code is not a postage code, step 5002 (FIG. 5), the routine then implements the step, 5010, of determining whether or not the postage control code is a class code. If it is a class code, step 5010, the routine implements the step, 5012, of obtaining the class from the input/processor 38 and storing it in the RAM 32, followed by implementing the step, 5014, of determining whether or not the weight of the mail is available. If the weight is not available, step 5014, then, processing is returned to the background program, "A", of FIG. 4. On the other hand, if the weight is available, step 5014 (FIG. 5), the routine proceeds to implementation of the step, 5016, of calculating the postage and storing the weight in the RAM 32, followed by implementing the previously discussed succesive steps, 5006 and 5008, of obtaining the T.A. No. and causing postage printing and then returning processing to the background program, "A", of FIG. 4. Assuming the postage control code is not a class code, step 5010 (FIG. 5), then, the routine implements the step, 5018, of determining whether or not the postage control code is a weight code. Assuming that it is a weight code, step 5018, then the routine implements the step 5020 of obtaining the weight from the input/processor 38 and storing the same in the RAM 32, followed by the step 5022 of determining whether or not the class of mail is available. If the class is not available, step 5022, processing is returned to the background program, "A", of FIG. 4. If, however, the class is available, step 5016 (FIG. 5), then, the successive steps 5016, 5006 and 5008 are implemented as previously discussed, followed by the return of processing to the background program "A", of FIG. 4. Assuming the postage control code is not a weight code, step 5018 (FIG. 5), the routine implements the step 5024 of determining whether or not the postage control code is a date code. If it is not a date code, step 5024, the routine returns processing to the background program, "A", of FIG. 4. If, however, the postage control code is a date code, step 5024 (FIG. 5), the routine obtains the override date from the input/processor 38 and stores the same in the RAM 32, step 502C, followed by the returning processing to the background program, "A", of FIG. 4.

As shown in FIG. 6, when the passport control code processing subroutine 6000 is invoked, the routine initially implements the step, 6002, of obtaining the T.A. No. from the NVM 26, followed by the step, 6004, of obtaining the time from this clock 36. Thereafter, the routine implements the step, 6006, of obtaining the descending register data from the NVM 26, followed by the step, 6008, of obtaining from the RAM 32, the date, batch number, piece count, mail class and total postage. Whereupon the routine implements the step, 6010, of determining whether or not sufficient postage is available for dispensing. If sufficient postage is available, step 6010,the routine implements the successive steps, 6012, 6014 and 6016 of updating the NVM 26, then updating the RAM 32, followed by causing the passport to be printed. Whereupon, the routine returns processing to the background program, "A", of FIG. 4. If however the funds available for dispensing are insufficient, step 6010 (FIG. 6), then the routine causes a fatal error to be printed, step 6018, thereby alerting the operator to the fact that additional funds must be obtained for processing the batch of mail, followed by returning processing to the background program, "A", of FIG. 4.

Figure 7:
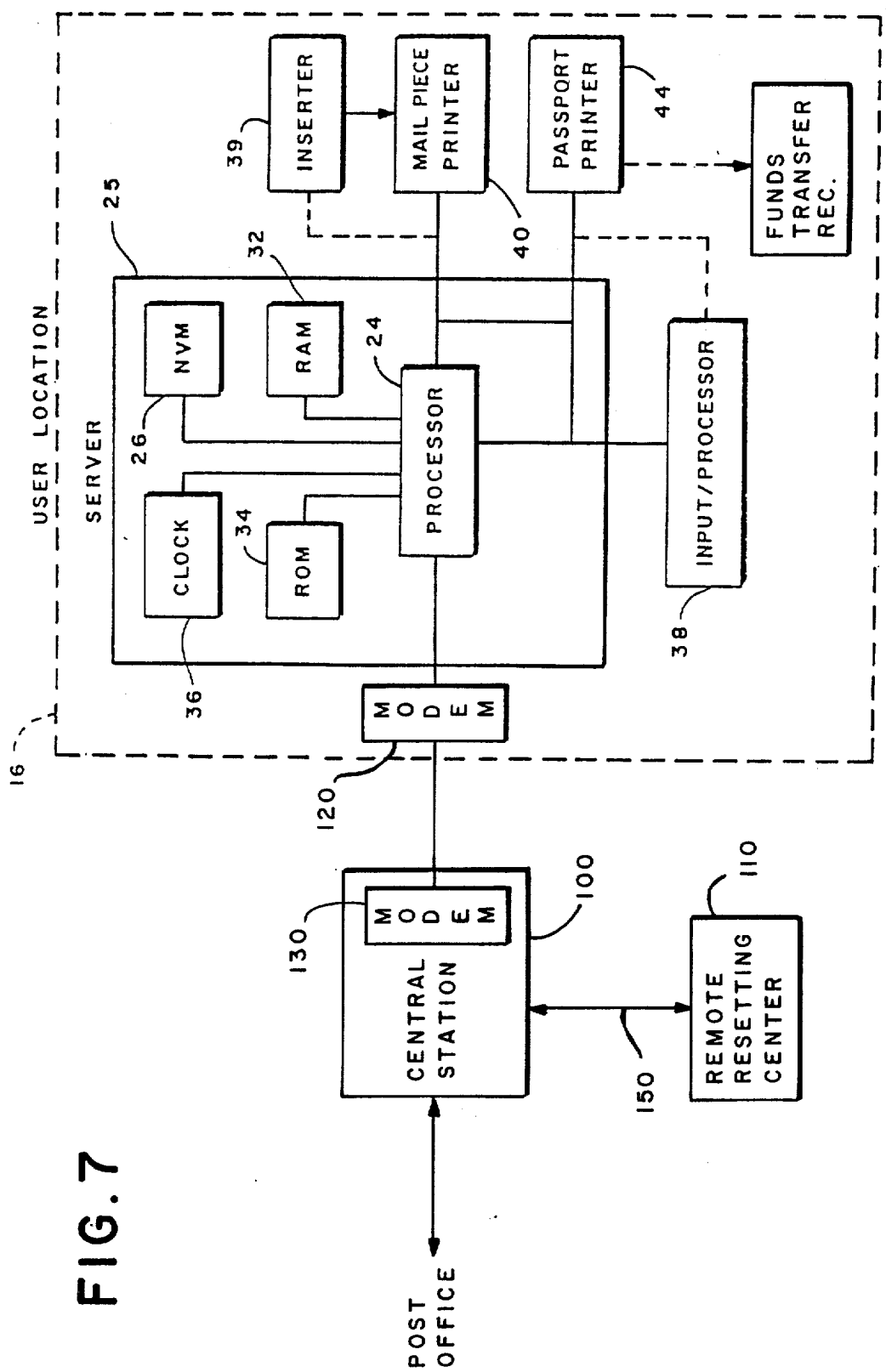
FIG. 7 is a block diagram of an alternative embodiment of a batch mailing system wherein the central station comprises apparatus for automatically communicating data between the sender's apparatus and the central station and wherein the central station communicates with a remote resetting center for funding the sender's apparatus.

FIG. 7 is an alternate embodiment of the system of FIG. 1 wherein like elements to those in FIG. 1 are denoted by like numbers. More particularly, the central station illustrated at 100 does not include the apparatus for transferring funds to the server 25; the funds transfer is accomplished by means of a separate communications link between the central station 100 and the remote resetting center shown at 110.

As seen in FIG. 7, the postal information processor 24 of server 25 is operatively connected to modem 120 for communication with modem 130 of the central station 100 by way of telephone connection as is well known in the art. The modems 120 and 130, are suitably auto-dial, auto-answer, self-contained modems, such as model ARK24K Plus available from ARK Inc., operating at a rate of 1200 BAUD.

The central station 100 may selectively be placed in communication with the remote resetting center 110 via a communication link 150 that may include a telephone communication system as described in U.S. Pat. No. 4,097,923 and U.S. Pat. Nos. 4,376,299 and 4,447,890 which are specifically incorporated by reference herein. The operation of the remote resetting center 110 in providing funding information to reset the descending registers of a postage meter is described in these references so that the discussion here will focus mainly on the feature unique to the present system.

It will be understood that the link 150 may comprise a serial communication system via a modem arrangement such as that illustrated between the server 25 and the central station 100; however, in the event that the central station 100 and remote resetting center 110 are physically located sufficiently near to each other a direct connection may is preferable. In such case communication may be accomplished by way of serial asynchronous character transmission at a rate of 9600 pbs, for example.

Further in accordance with the invention, the postal information processor 24 of the server 25 controls the passport printer 44 for the printing of a document 160 (shown in more detail in FIG. 8) that provides printed accounting for the transfer of funds between the remote resetting center 110 and the accounting means 26 of the server 25. It will be understood that this document may be printed in addition to the printing of the passport 46 as previously described. It will be understood that other forms of such documentation are also contemplated.

FIG. 8 illustrates a document 160 for funds transfer, in accordance with the invention, printed by the passport printer 44. As illustrated, this document has printed thereon the date of the transaction, the transaction number, the amount of the transfer, the time of the transaction, the communication number and the new balance.

Figure 9:
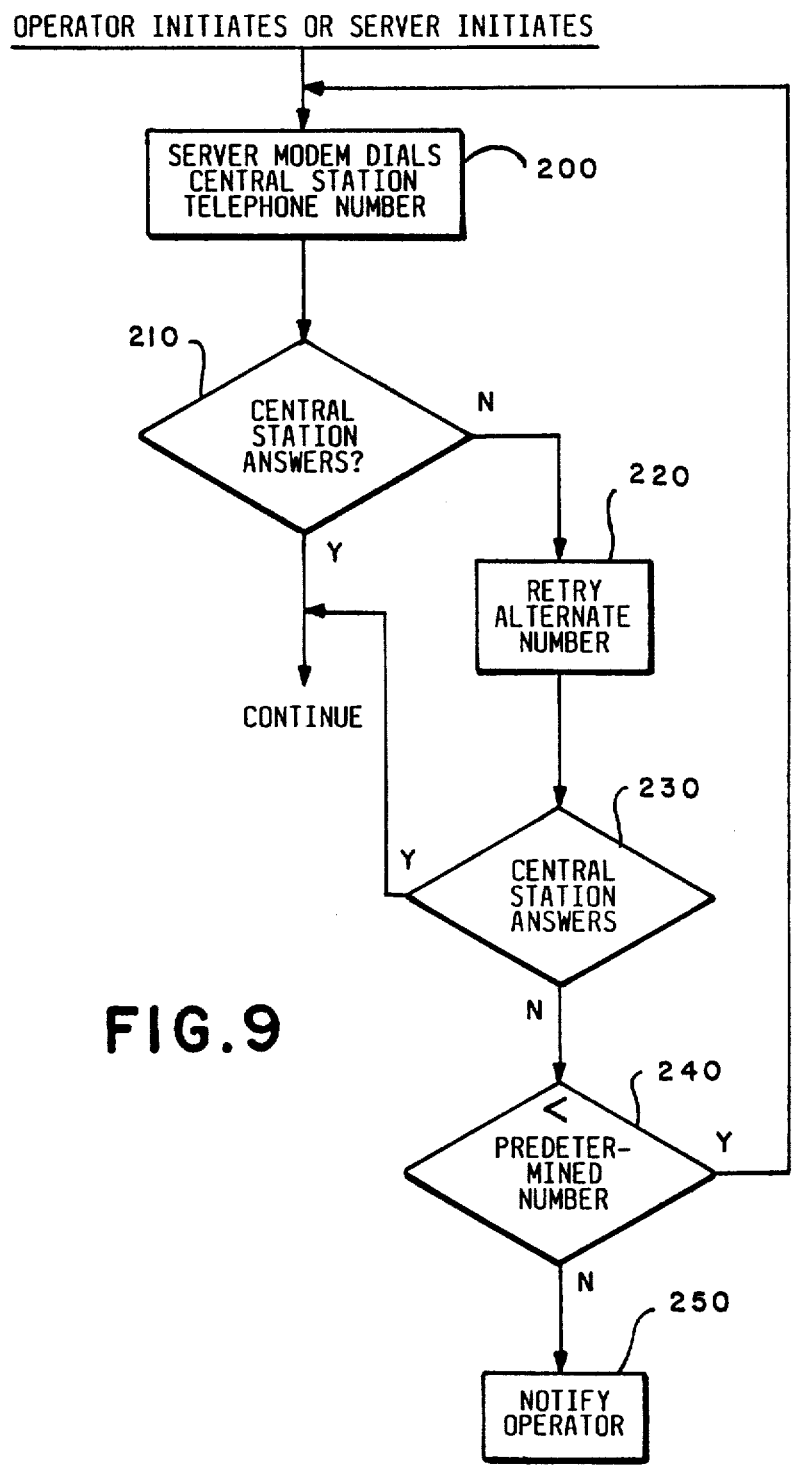

FIG. 9 is a flow chart for the initiation of the communication of data between the central station 100 and the postal information processor of the server 25. It is preferable that all communications be based on the server 25 calling the central station 100. This allows the server 25 to communicate only when it is not busy and the server 25 in this way will only accept funds on an outgoing call that it made to a previously stored number. This reduces the possibility of someone fraudulently attempting to fund the machine from an outside phone call.

Turning now to FIG. 9, whenever the server 25 is to be placed into communication with the central station 100, it dials the central station number which has been stored as a parameter in the system (block 200). If the central station 100 answers and the carrier is detected (block 210), the sign-on procedure shown in FIG. 11a begins. If the central station 100 does not answer or the line is busy, the server 25 enters the retry mode. The server 25 tries an alternate number if provided (block 220). If connection is made (block 230), the system proceeds to sign-on; if not, and if the attempts are less than a predetermined number (block 240) the attempts to dial will alternate between the two numbers until the predetermined number is reached and the operator is alerted to the problem (block 250). It will be appreciated that the time for delay between retries and the predetermined number of retries may be stored in a system parameter table so that it may be changed if desired. The server 25 may also automatically initiate the call when a predetermined number of passports is reached.

FIG. 10 is the flow diagram for a central station 100 initiated connection. The server's modem 120 remains in the auto-answer mode in anticipation of communications from the central station 100. In this case, the central station 100 dials the number of the server 25 (block 300) and when the carrier is detected, a session request message is transmitted to the server 25 (block 310). The message is equivalent to "I want to talk to you." The central station 100 hangs up to await the call from the server 25 (block 320). If the call is received within a predetermined period of time (decision block 330), the communication is established as previously described in connection with FIG. 9. If the call is not received, an error is logged and the central station 100 again attempts to contact the server 25 for a predetermined number of retries (block 350) and if not successful, an operator at the central station 100 is notified (block 360).

Figure 11A:
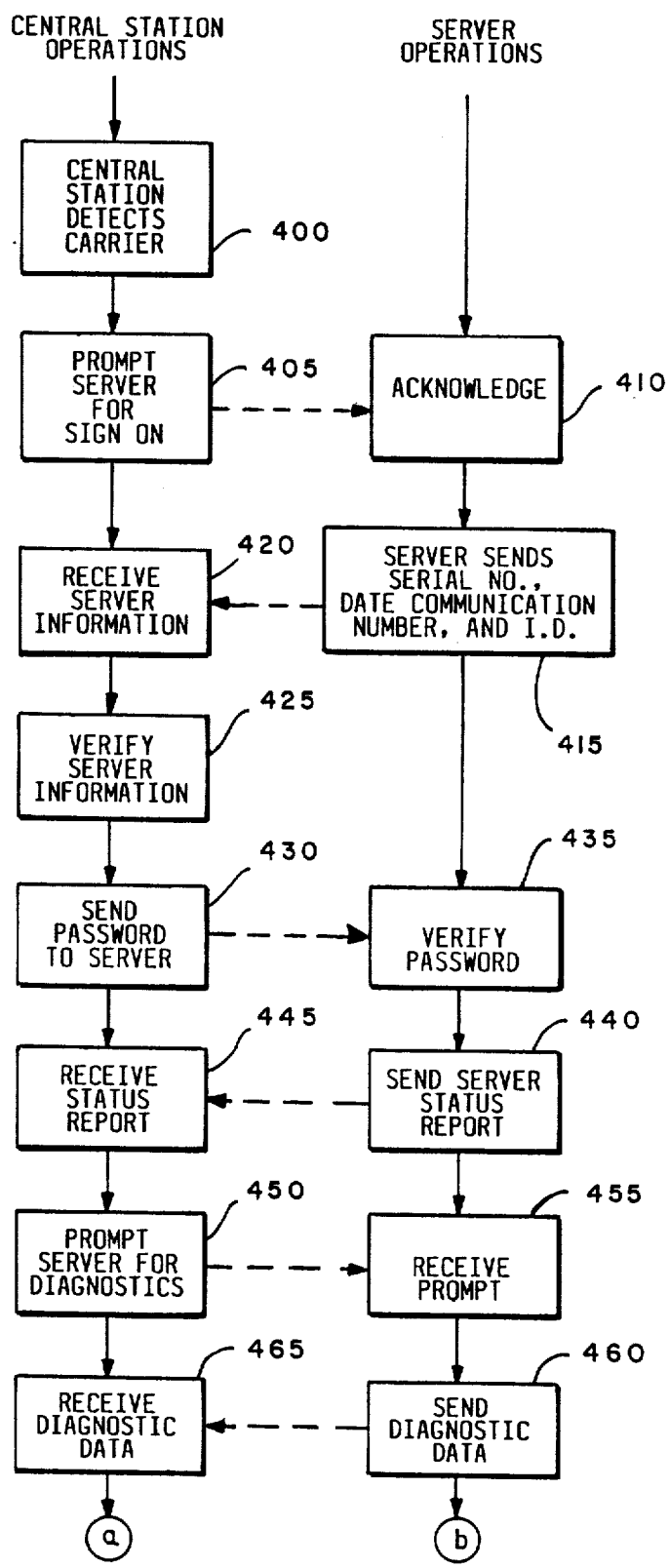
Figure 11B:
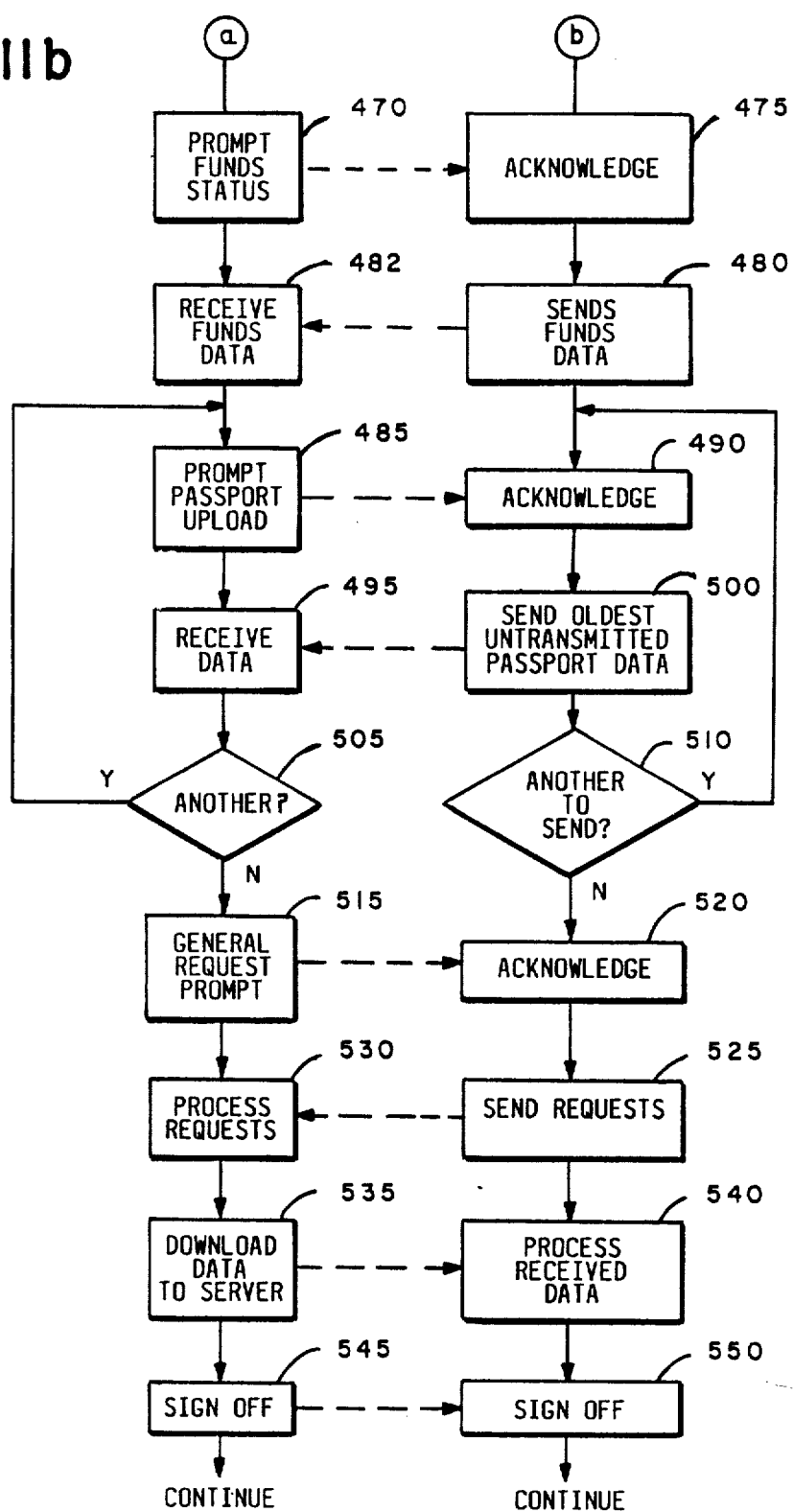

FIGS. 11a and 11b comprise a composite flow chart of the operations for the communication of data between the central station 100 and a server 25 once contact has been established. Once modem 130 of the central station 100 has detected the carrier signal (block 400), it prompts the server 25 (block 405) which in turn acknowledges (block 410) and returns sign-on data (block 415). As noted in the previous embodiment, this data may be a serial number, a communications number, the date, server I.D. and the like as desired. The central station 100 receives this information (block 420), verifies it (block 425), and sends a password to the server 25 (block 430).

Once the server 25 verifies the password from the central station 100 (block 435), it proceeds to send the central station 100 a status report (block 440). Preferably the server 25 status report will include the current time and date. This information may be used to check the server's clock. The current rate table and indicia I.D. may be transmitted in order to ensure that the proper ones are in use. Other information relating to the server 25, such as for example the current state of the server 25, whether it is locked or unlocked, or a weak memory flag, may be transmitted to the central station 100 as well. Diagnostic flags may also be communicated. It will be understood that the data may be communicated in plaintext or coded using conventional techniques if desired.

In the previously discussed embodiment, it was suggested that the passport information be uploaded for each batch of processed mail. While this of course works well, it is preferable that the server 25 be able to accumulate data relating to a plurality of passports. In this manner there is not the urgent necessity for contacting the central station 100 at the end of each batch run. Thus, there may be required a transmission of a plurality of messages regarding the stored passport data. In the event, the status message may include the number of pending passports which are ready to be transmitted to the central station 100 and the date and time of the oldest passport.

After receipt of the status report (block 445), the central station 100 may selectively prompt for diagnostic reports as desired (block 450) that are received by the server 25 (block 455) that in turn sends the central station 100 any messages relating to diagnostic tests that have been performed either automatically or as initiated by the operator or the central station 100 (block 460). When the diagnostic messages have been received (block 465), the central station 100 sends a funds status prompt (block 470) to which the server 25, which in turn acknowledges (block 475) and returns the funds data (block 480) stored in its registers. This information may include the ascending register data, descending register data, and the sum of these registers, i.e. the control sum, along with an identification number identifying the accounting means if desired.

At this juncture, after receiving the funds data (block 482) from the server, the central station 100 prompts the server for the uploading of accumulated passport data (block 485), which acknowledges the prompt (block 490) and the data is transmitted from the server 25 (block 500), preferably with the data from the oldest passport being sent first. The server then determines whether or not passport data from another passport is available to be sent (block 510) and, if there is (block 510), the server loops (block 490) to acknowledge a further prompt (block 485) from the central station. Meanwhile, upon receiving the oldest passport data (block 495) from the server, the central station 100 determines whether or not another transmission of next oldest passport data is to be received (block 505) and, if it is, the central station loops (block 505) to prompt the server (block 485) to send the next oldest passport data (block 500), which is followed by the central station receiving the data (block 495) and then again determining if data from another passport is to be sent (block 505). Then the server processing steps 490, 500 and 510 are repeated sequentially in response to further prompts from the central station 100, and the central station processing steps 485, 495 and 505 are sequentially repeated in respone to a positive response to the inquiry as to whether or not another transmission of passport data is to be received (block 505), until no more passport data is available; to be transmitted (decision block 510) and, therefore the decision block 505 no longer loops to block 485.

Thereafter in response to a general request prompt from the central station 100 (block 515), to the server acknowledges the prompt (block 520) followed by sending a general request (block 525) to the central station which, in-turn, processes the request (block 530) followed by downloading data pertaining thereto to the server (block 535) and then signing-off (block 545). The server, in turn, processes the received data (block 540) and then signs-off (block 540). As an example, the general request (block 515) may be that the server 25 initiates a funds transfer request described further below in conjunction with FIG. 13 (block 525). Once this process is completed, the central station 100 downloads any necessary changes in data to the server 25 (block 535). This information also can be such things as new postal rates, clock-setting information, new passwords and the like.

At the end of the communications session, the central station 100 communicates a sign-off message to the server 25 that then hangs up as does the central station 100 (blocks 545 and 550).

Figure 12:
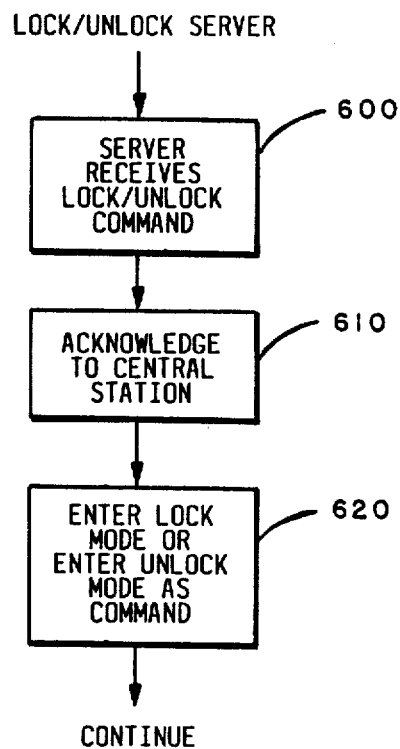

Turning now to FIG. 12 there is shown a further feature in regard to the invention. During the course of communication between the central station 100 and the server 25 the central station 100 may selectably transmit a message to the server 25 to cause the server 25 to enter a locked-out mode. For best results, whenever the server 25 is placed in this mode, all mail processing functions are disabled while all the other functions are operable.

The central station 100 sends the message for locking or unlocking the server 25 that is received by the server 25 (block 600) with an acknowledgment to the central station 100 (block 610) whereupon the server 25 enters into its "lock" or "unlock" mode (block 620), wherein it respectively locks or unlocks the mail processing functions in accordance with the instruction.

Figure 13:
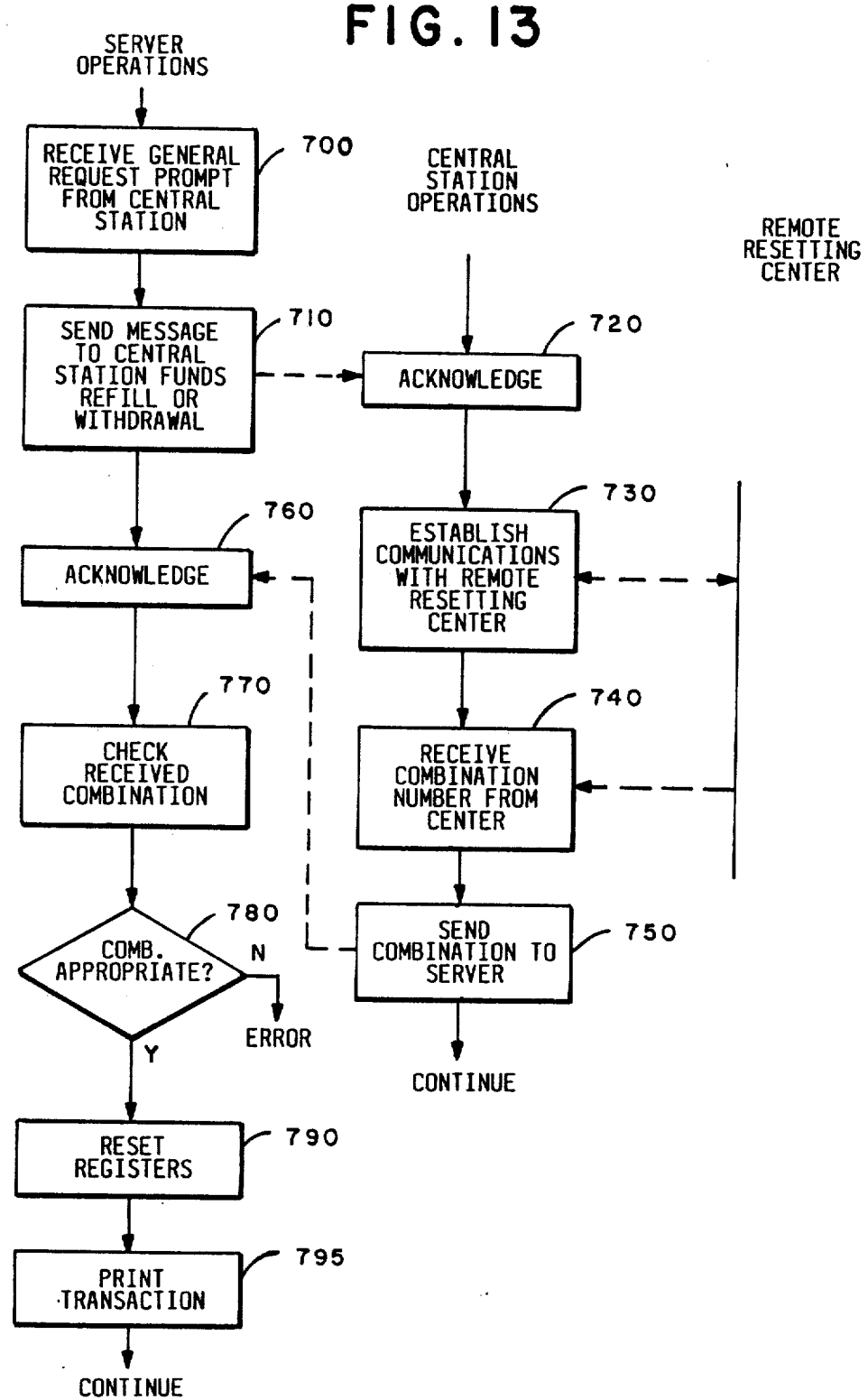

FIG. 13 shows a composite flow chart of the communication of data between the server 25, central station 100, and the remote resetting center 110 for the purpose of funding or withdrawing funds from the server 25 and performing the corresponding accounting in the remote resetting center 110 through the central station 100 in accordance with the invention.

Upon receipt of the general request prompt from the central station 100 (block 700 or block 515 in FIG. 11b), the server 25 responds with a request for funds refill or funds withdrawal. The request message, which includes data input through the input terminal or as previously stored to supply the information necessary for the calculation of the resetting algorithm, is sent to the central station (block 710), where it is acknowledged (block 720). This information may include the amount, an access mode, and an I.D. number.

The central station 100 thereupon establishes communication with the remote resetting center 110 (block 730) to obtain the appropriate combination number for the transaction from the remote resetting center 110 (block 740). This number is communicated to the server 25 (block 750) that acknowledges the communication (block 760) and checks the combination (block 770) and if it compares appropriately with its own calculated combination (decision block 780) the registers of the server 25 are reset with the new numbers (block 790). A document may then be printed to reflect the funds transfer (block 795).

Figure 14:
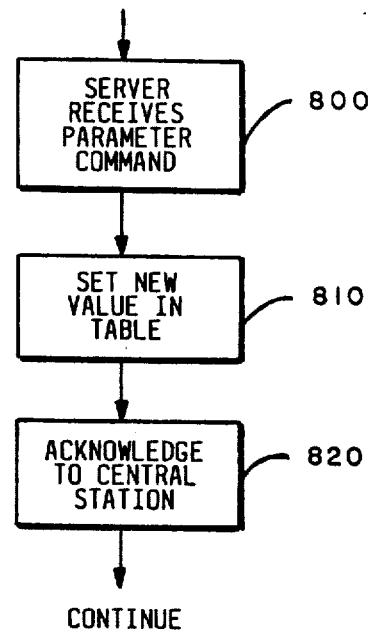

FIG. 14 illustrates the downloading of information from the central station 100 to the server 25. It has been found preferable that the server 25 also store a table of system parameters. At least some of the parameters may be change by messages from the central station 100. As seen in FIG. 14, the central station 100 sends a parameter command that includes a parameter number and value (block 800 or block 535 in FIG. 11b) upon which the server 25 places the new value in the table (block 810) and acknowledges the transaction to the central station 100 (block 820). The transaction may suitably be used for the purpose of setting the clock in the server 25 as well as for changing for example the system passwords and dialling parameters including the number of retries and the time between retries. It will be appreciated that similar transactions will enable the downloading of changes in the graphics data to be printed by the printer or for changing postal rates as required whenever postal rates change.

The system in accordance with the invention thus provides a means and a method for achieving a central station 100 for use in conjuction with a plurality of servers 25 that will not require extensive changes to existing remote meter resetting facilities and is compatible with them.

What is claimed is:

1. A value resetting system comprising:
   a mailing location, said mailing location having means for storing and accounting for value;
   means for data collection remote from said mailing location;
   means for establishing communication between said mailing location and said data collection means;
   means, remote from said mailing location, for resetting said value in said storing and accounting means; and
   means for selectively locking and unlocking said mailing location, said locking means being operative via said communication establishing means.

2. The system of claim 1 wherein said communication establishing means includes:
   a first modem, said first modem being disposed at said mailing location; and
   a second modem, said second modem being disposed with said data collection apparatus.

3. The system of claim 1 wherein said communication establishing means is a serial transmission means for direct communication of information.

4. The system of claim 1 wherein said value resetting means included means for accounting for and transferring value.

5. The system of claim 1 wherein mail is processed in batches and data relative thereto is stored at said mailing location for subsequent communication to said data collection apparatus.

6. The system of claim 5 wherein said batch related data is communicated to said data collection apparatus on a priority basis when a predetermined number of batches have been processed.

7. The system of claim 1 wherein said mailing location further comprises:
   a printer; and
   means for controlling said printer, said printer control means communicating with said value storing and accounting means such that information relating to said value can be printed.

8. The system of claim 7 wherein said printer is controlled to print information relating to said value resetting means.

9. The system of claim 7 wherein said value resetting means is remote from said data collection apparatus.

10. The system of claim 9 further comprises:
    means for establishing communication between said value resetting means and said data collection apparatus such that communication between said value resetting means and said mailing location can be established.

11. A method of changing a funds register of a mailing location having stored information thereat in addition to the data in said funds register, said method comprising the steps of:
    establishing a communication link between a mailing location and a remote data collection apparatus, communicating stored information from said mailing location to said remote data collection apparatus;
    establishing a further communications link between the remote data collection apparatus and a remote resetting apparatus for enabling communication between said mailing location and said remote resetting apparatus, communication between said mailing location and said remote resetting apparatus being enabled only through said remote data collection apparatus such that said stored information is collected at said remote data collection apparatus whenever said funds register is to be changed;
    communicating data between said mailing location and said remote resetting apparatus, said data including information indicative of the amount that said funds register is to be changed; and
    changing said funds register by said amount.

12. The method of claim 11 wherein the information communicated to said remote data collection apparatus includes funds register data.

13. The method of claim 11 further comprising the step of printing a document showing the transaction of changing said funds register by said amount.

* * * * *